3,487,114
PREPARATION OF m-ARYLOXYPHENOLS
Gether Irick, Jr., and Gary F. Hawkins, Kingsport, Tenn.,
assignors to Eastman Kodak Company, Rochester, N.Y.,
a corporation of New Jersey
No Drawing. Continuation-in-part of application Ser. No. 239,047, Nov. 20, 1962. This application May 8, 1967, Ser. No. 636,585
Int. Cl. C07c 41/10
U.S. Cl. 260—613      10 Claims

ABSTRACT OF THE DISCLOSURE

Preparation of aromatic ethers and more particularly m-aryloxyphenols from a m-dihydroxy benzene, such as resorcinol, and an aryl halide, such as bromobenzene, by heating the m-dihydroxybenzene and the aryl halide in the presence of an alkaline compound and a copper-containing catalyst in which the copper is in a state of oxidation less than 2, such as cuprous oxide, cuprous chloride, or cuprous acetate and preferably in the presence of a polar solvent.

---

This application is a continuation-in-part of our copending U.S. application Ser. No. 239,047 which was filed Nov. 20, 1962 and now abandoned and entitled "Perparation of m-Aryloxyphenols."

This invention relates to a method for the preparation of aromatic ethers and more particularly to a method for the preparation of m-aryloxyphenols from m-dihydroxy benzenes and aryl bromides.

The preparation of ethers by the condensation of organic halides and organic hydroxy compounds is known to the prior art. However, it has not been practical to prepare m-aryloxyphenols by the condensation of m-dihydroxy benzenes and aryl halides.

We have found, contrary to the teachings of the prior art, that m-aryloxyphenols can be prepared by condensing an aryl bromide with a m-dihydroxy benzene when the reaction is carried out under a novel combination of reaction conditions in the presence of an alkaline compound and a copper-containing catalyst.

The reaction can be represented by the following equation:

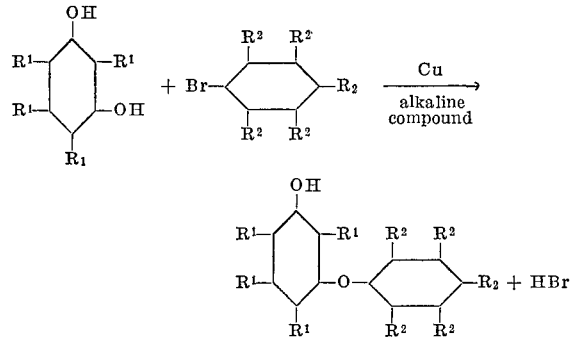

In the above formulae the substituents $R^1$ may be the same or different substitutents such as hydrogen or alkyl, aryl, alkoxy or aryloxy radicals at least 2 of which substituents are hydrogen. The substitutents $R^2$ may be the same or different substituents such as hydrogen, halogen, and alkyl, aryl, alkoxy or aryloxy radicals. Preferably, as organic radicals $R^1$ and $R^2$ are lower alkyl or lower alkoxy radicals having, e.g., 1 to about 4 carbon atoms, or mononuclear aryl or aryloxy radicals which are unsubstituted or have lower alkyl substitutuents. The substituents should not adversely affect the reaction and more particularly, the substituents should not be affected by the alkaline compound which is present while the reaction takes place. In a preferred embodiment of the invention, all of the substitutents $R^1$ are hydrogen so that the m-dihydroxy benzene is resorcinol and all of the substitutents $R^2$ are hydrogen so that the aryl bromide is bromobenzene. In another preferred embodiment of the invention, one of the substitutents $R^2$ is a halogen selected from chlorine or fluorine so that the aryl bromide is a halobromobenzene such as bromochlorobenzene or bromofluorobenzene.

Examples of other m-dihydroxy benzenes which are useful in the reaction include but are not limited to 4-methyl resorcinol; 2,4-diethyl resorcinol; 6-ethoxy resorcinol; 5-phenyl resorcinol; 2-phenoxy resorcinol; 2-methyl-5-phenoxy resorcinol; and 5-m-tolyl resorcinol.

Examples of other aryl bromides which are useful in the reaction include but are not limited to 2-phenyl bromobenzene, 3-phenylbromobenzene, 4-phenyl bromobenzene, 2-phenoxy bromobenzene, 3-phenoxy bromobenzene, 4-phenoxybromobenzene, 2-ethyl bromobenzene, 3-methyl bromobenzene, 4-propyl bromobenzene, 2-methoxy bromobenzene, 3-isobutoxy bromobenzene and 4-propoxy bromobenzene.

The process of the invention is carried out by heating the selected m-dihydroxy benzene and the selected aryl halide in the presence of an alkaline compound and a copper-containing catalyst in which the copper is in a state of oxidation less than 2. Thus the copper may for example be in the form of the metal itself represented by $Cu^0$ or in the form of a cuprous compound represented by $Cu^I$ or in any state of oxidation less than the cupric condition. Examples of alkaline compounds which are useful in the reaction include but are not limited to potassium hydroxide, potassium carbonate, sodium hydroxide, sodium carbonate, lithium hydroxide, lithium carbonate and ammonium hydroxide. In a preferred embodiment of the invention the alkaline compound is potassium hydroxide or potassium carbonate. This general class of alkaline compounds can be referred to as substances that are basic in aqueous solution, although it should be understood that the reaction can be carried out in non-aqueous media. The alkaline compound employed can be of commercial purity, e.g., 85% potassium hydroxide.

Examples of the copper-containing catalysts referred to in the preceding paragraph which are useful in the reaction include but are not limited to metallic copper, cuprous oxide, cuprous chloride, cuprous bromide, cuprous iodide and cuprous acetate. Cuprous oxide has proved to be especially efficacious as a catalyst for the reaction.

In carrying out the reaction, the reactants may be initially mixed in the reaciton vessel or some of the reactants may be added over a period of time. In a preferred embodiment of the invention, the reactants are all initially mixed in the reaction vessel.

In some cases we have found that it is necessary to employ an excess of the m-dihydroxy benzene with respect to the aryl bromide and alkaline equivalent in order for the reaction to proceed satisfactorily. In this regard, a preferred embodiment of the invention calls for the use of about three moles of m-dihydroxy benzene per mole of aryl bromide and alkaline equivalent. We have discovered that when such a mole ratio of reactants is employed the formation of tar is markedly reduced. It is satisfactory to employ approximately equimolar amounts of aryl bromide and alkaline equivalent though a preferred embodiment of the invention employs slightly more than one mole of aryl bromide per mole of alkaline equivalent. It is understood that the phrase "alkaline equivalent" refers to the amount of alkaline compound which will liberate one mole of hydroxyl ions in aqueous solution, although it should be understood that the reaction can be carried out in non-aqueous media. For example an alkaline equivalent of sodium hydroxide is about 40 parts by weight while an alkaline equivalent of potassium carbonate is about 69 parts by weight.

Another essential element in our novel combination of reaction conditions is the use of a minimum temperature of about 170° C. Thus, in accordance with the invention we carry out the reaction at a temperature within the range of about 170° C. to about 250° C. A preferred embodiment of the invention which produces superior results with all or most of the suitable reactants comprises carrying out the reaction at a temperature in the range of about 180° C. to about 195° C.

We carry out the reaction in the liquid phase. Since, at the temperature of reaction, one or more of the reactants may normally be in the gaseous phase, we employ a reaction pressure sufficient to maintain the reactants in the liquid phase.

We have discovered, as an element of a preferred embodiment of our process, that when a polar solvent is added to the reaction mixture tar formation is reduced and the yield of m-aryloxyphenol is increased. Any polar solvent in which the alkaline compound and the m-dihydroxy benzene are soluble may be used. Examples of preferred polar solvents are hydroxy compounds such as diethylene glycol and water and amino compounds such as quinoline, $\gamma$-collidine, N,N-dimethylacetamide, benzylamine, N,N-dimethylaniline, and pyridine.

Thus a preferred embodiment of the invention comprises heating at a temperature of about 180° C. to about 195° C. a mixture of about three moles of resorcinol, about one mole of bromobenzene and about one mole of potassium hydroxide in the presence of water and a cuprous oxide catalyst.

The following examples are illustrative of the process of the invention.

EXAMPLE 1

Three hundred and thirty parts resorcinol, 157 parts bromobenzene, 66 parts potassium hydroxide (85%), 75 parts diethylene glycol and 12 parts cuprous oxide are charged to an agitated autoclave. The system is purged with nitrogen, closed and heated for four hours at 185° C. The reaction mixture is washed from the autoclave with water, acidified and extracted with benzene. The benzene extract is washed with water and fractionated to give 115.5 parts m-phenoxyphenol, thus giving a conversion of 62.2% of theoretical, based on the bromobenzene employed.

EXAMPLE 2

Three hundred and thirty parts resorcinol, 157 parts bromobenzene, 6 parts cuprous oxide and 66 parts potassium hydroxide (85%) in 50 parts water are charged to an agitator type autoclave under an initial nitrogen pressure of 50 lb./in.$^2$. The system is closed and stirred for four hours at 188° C. The reaction mixture is washed from the autoclave with water, acidified and extracted with benzene. The benzene extract is washed with water and fractionated to give 98 parts of m-phenoxyphenol, thus giving a conversion of 52.7% of theoretical, based on the bromobenzene employed.

EXAMPLE 3

Three hundred and thirty parts of resorcinol, 314 parts bromobenzene, 6 parts cuprous oxide and 66 parts potassium hydroxide (85%) are charged to an agitated autoclave and the system is purged with nitrogen. The system is closed and heated for one hour at 184–190° C. The reaction mixture is washed from the autoclave with water, acidified and extracted with benzene. The benzene extract is washed with water and fractionated to give 94.6 parts of m-phenoxyphenol, thus giving a conversion of 51% of theoretical, based on the bromobenzene employed.

EXAMPLE 4

Six parts cuprous oxide, 52 parts potassium carbonate, 100 parts water, 120 parts bromobenzene and 248 parts resorcinol are charged to an agitated autoclave under an initial hydrogen pressure of 100 lb./in.$^2$ and heated at 185° C. for one hour. The mixture is cooled to room temperature, 120 parts bromobenzene, 52 parts potassium carbonate, 6 parts cuprous oxide are added and the system placed under a hydrogen pressure of 100 lb./in.$^2$. This mixture is heated at 185–190° C. for 2 hours. The reaction mixture is acidified and steam distilled to recover 84.5 parts of bromobenzene. The remainder of the reaction mixture is extracted with benzene and the benzene extract is washed with water and fractionated to give 112.5 parts of m-phenoxyphenol, thus giving a conversion of 40.2% of theoretical based on the bromobenzene employed and a yield of 61% based on unrecovered bromobenzene.

EXAMPLE 5

Three hundred and thirty parts resorcinol, 158 parts bromobenzene, 6 parts cuprous oxide and 66 parts potassium hydroxide (85%) are charged to an agitator type autoclave under an initial nitrogen pressure of 50 lb./in.$^2$. The system is closed and heated with agitation at 188° C. for four hours. The reaction mixture is acidified and extracted with benzene. The benzene extract is then fractionated to give 74 parts m-phenylphenol. This amounted to a conversion of 39.8% of theoretical, based on the bromobenzene employed.

EXAMPLE 6

Two hundred and twenty parts resorcinol, 158 parts bromobenzene, 6 parts cuprous oxide and 66 parts potassium hydroxide in 50 parts water are charged to an agitator type autoclave under an initial nitrogen pressure of 50 lb./in.$^2$. The system is then closed and stirred for six hours at 188° C. The reaction mixture is acidified and extracted with benzene. The benzene extract is then fractionated to give 48 parts of m-phenoxyphenol. This amounts to a conversion of 25.8% of theoretical, based on the bromobenzene employed.

EXAMPLE 7

Six hundred and sixty parts resorcinol, 132 parts potassium hydroxide, 50 parts water and 6 parts cuprous oxide are charged to a reaction vessel fitted with a thermometer, mechanical stirrer, two dropping funnels and a Dean-Stark distillation head. The mixture is heated to 185° C. and 314 parts bromobenzene added under vigorous reflux at 185–190° C. over a period of 2.5 hours. The reaction mixture is then acidified and extracted with benzene. The benzene extract is fractionated to give 67.9 parts of m-phenoxyphenol. This amounts to a conversion of 18.5% of theoretical, based on the bromobenzene employed.

EXAMPLE 8

Six parts cuprous oxide, 52 parts potassium carbonate, 100 parts water, 134 parts p-bromofluorobenzene and 248 parts resorcinol are charged to an agitated autoclave, purged with nitrogen and stirred for 1 hour at 185–190° C. under a pressure of approximately 300 pounds per square inch. The mixture is cooled to room temperature, 134 parts p-bromofluorobenzene, 52 parts potassium carbonate, 6 parts cuprous oxide added and the system purged with nitrogen and heated at 185–190° C. for 1.5 hours. Upon cooling to room temperature, the batch is removed from the autoclave with the assistance of hot water. The pH is adjusted to 2.5 by addition of concentrated sulfuric acid, 500 parts water added and the mixture extracted twice with 560 parts benzene. The combined extracts are washed four times with 500 parts hot water. The washes are then discharged and the benzene solution distilled to give 124 parts recovered p-bromofluorobenzene and 66 parts 4'-fluoro-m-phenoxyphenol B.P.

145°/1.0 mm. This amounts to a 39.4% yield based on unrecovered p-bromofluorobenzene.

EXAMPLE 9

Five parts cuprous oxide, 330 parts resorcinol, 69 parts potassium carbonate, 100 parts water and 191.5 parts m-bromochlorobenzene are charged to an agitated autoclave, purged with nitrogen and stirred for 4 hours at 185–190° C. and a pressure of approximately 200–300 p.s.i. The mixture is cooled to room temperature and removed from the autoclave with the assistance of 500 parts hot water. The pH is adjusted to 2.5 with dilute sulfuric acid and one extraction made with 600 parts benzene. The benzene extract is washed three times with 500 parts water and the wash discarded. The benzene layer is then distilled to give 74 g. recovered m-bromochlorobenzene and 68 g. 3′-chloro-m-phenoxyphenol. This amounts to a 50.2% yield, based on unrecovered m-bromochlorobenzene.

EXAMPLE 10

Three hundred and thirty parts resorcinol, 157 parts bromobenzene, 10 parts cuprous iodide, 25 parts of quinoline and 66 parts potassium hydroxide (85%) in 50 parts water are charged to an agitator type autoclave under an initial nitrogen pressure of 50 lb/in.$^2$. The system is then closed and stirred for four hours at 188° C. The reaction mixture is next washed from the autoclave with water, acidified and extracted with benzene. The benzene extract is washed with water and fractionated to give 49 parts of m-phenoxyphenol. This amounts to a conversion of 26.5% of theoretical, based on the bromobenzene employed.

EXAMPLE 11

A mixture of 110 parts resorcinol, 157 parts bromobenzene, 71.5 parts cuprous oxide and 516 parts of quinoline are heated at reflux (193–248° C.) for 6.5 hours while stirring in a nitrogen atomsphere and removing the water formed. Upon cooling the reaction mixture sets up into a solid mass because of the formation in situ of a solid complex of Cu$^I$ bromide with quinoline. The mass is then transferred to a Buchner funnel with the aid of diethyl ether. The residue on the funnel is washed with ether until the filtrate is colorless. The filtrate is then washed with 10% aqueous HCl to remove the quinoline. The ether layer is dried and then distilled at reduced pressure to give 101 parts of m-phenoxyphenol (representing 54.2% conversion based on the bromobenzene employed) The quinoline and cuprous oxide may be recovered for reuse by heating the solid complex and the acid wash water with an aqueous base such as sodium hydroxide.

EXAMPLE 12

When Example 11 is repeated using 48.4 g. (0.4 mole) γ-collidine instead of quinoline, 9.8 g. of m-phenoxyphenol are obtained.

EXAMPLE 13

When Example 11 is repeated using 34.8 g. (0.4 mole) N,N-dimethylacetamide instead of quinoline, 6.5 g. of m-phenoxyphenol are obtained.

EXAMPLE 14

When Example 11 is repeated using 42.8 g. (0.4 mole) benzylamine instead of quinoline 6.8 g. of m-phenoxyphenol are obtained.

EXAMPLE 15

When Example 11 is repeated using 48.4 g. (0.4 mole) N,N-dimethylaniline instead of quinoline, 7.0 g. of m-phenoxyphenol are obtained.

EXAMPLE 16

When a mixture of 11 g. (0.1 mole) resorcinol, 15.7 g. (0.1 mole) bromobenzene, 7.2 g. (.05 mole) cuprous oxide and 31.2 g. (0.4 mole) pyridine is stirred in an autoclave at 170–5° for 5 hrs., cooled and mixed with 500 ml. ether, the filtered and water-washed ether extract can be distilled to give 9 g. of m-phenoxyphenol.

The invention has been described in considerable detail with particular reference to certain preferred embodiments thereof, but it will be understood that variations and modifications can be effected within the spirit and scope of the invention as described hereinabove, and as defined in the appended claims.

We claim:
1. The method of preparing m-aryloxyphenols which comprises heating:
 (a) a m-diyhdroxy benzene selected from the group consisting of resorcinol; 4-methyl resorcinol; 2,4-diethyl resorcinol; 6-ethoxy resorcinol; 5-phenyl resorcinol; 2-phenoxy resorcinol; 2-methyl-5-phenoxy resorcinol and 5-m-tolyl resorcinol;
 (b) an aryl bromide selected from the group consisting of p-bromofluorobenzene; m-bromochlorobenzene; 2-phenyl bromobenzene; 3-phenyl bromobenzene; 4-phenyl bromobenzene; 2-phenoxy bromobenzene; 3-phenoxy bromobenzene; 4-phenoxy bromobenzene; 2 ethyl bromobenzene; 3-methyl bromobenzene; 4-propyl bromobenzene; 2-methoxy bromobenzene; 3-isobutoxy bromobenzene and 4-propoxy bromobenzene; and
 (c) an alkaline compound selected from the group consisting of potassium hydroxide, sodium hydroxide, lithium hydroxide, potassium carbonate, sodium carbonate, lithium carbonate and ammonium hydroxide, in the presence of a copper-containing catalyst in which the copper is in a state of oxidation less than 2 at a temperature of 170°–250° C., in the liquid phase, the mole ratio of the m-dihydroxybenzene to the aryl bromide and the alkaline equivalent being not less than 1:1.

2. The method of claim 1 in which the catalyst is selected from the group consisting of metallic copper, cuprous oxide, cuprous chloride, cuprous bromide and cuprous acetate and in which the m-dihydroxy benzene and the aryl bromide are reacted in the presence of a polar solvent selected from the group of water, diethylene glycol, quinoline, γ-collidine, N,N-dimethylacetamide, benzylamine, N,N-dimethylaniline and pyridine.

3. The method of claim 2 in which the m-dihydroxy benzene is resorcinol, the aryl bromide is selected from the group consisting of bromobenzene; p-bromofluorobenzene and m-bromochlorobenzene, the catalyst is cuprous oxide, and the alkaline compound is potassium hydroxide or potassium carbonate.

4. The method of claim 2 in which the m-dihydroxy benzene is resorcinol, the aryl bromide is selected from the group consisting of bromobenzene, m-bromochlorobenzene and p-bromofluorobenzene, the alkaline compound is a potassium compound selected from the group consisting of potassium hydroxide and potassium carbonate, and the polar solvent is selected from the group consisting of water and diethylene glycol, the mole ratio of resorcinol to the aryl bromide is not less than about 3:1 and the mole ratio of the aryl bromide to potassium is not less than about 1:1.

5. The method of claim 4 in which the aryl bromide is bromobenzene, the alkaline compound is potassium carbonate and the polar solvent is water and the temperature is within the range of 185°–190° C.

6. The process of claim 4 in which aryl bromide is bromobenzene, the alkaline compound is potassium hydroxide, the catalyst is cuprous oxide, the polar solvent is diethylene glycol and the temperature is within the range of 180°–195° C.

7. The process of claim 6 in which the alkaline compound is potassium carbonate and the mole ratio of resorcinol to potassium is not less than about 1:1.

8. The method of claim 6 in which the polar solvent is diethylene glycol and the mole ratio of bromobenzene to potassium is about 1:1.

9. The method of preparing 4′-fluoro-m-phenoxyphenol which comprises heating resorcinol, p-bromofluorobenzene and potassium carbonate in the presence of water and a cuprous oxide catalyst at a temperature within the range of 180°–250° C. in the liquid phase, the mole ratio of resorcinol to p-bromofluorobenzene being not less than about 3:1 and the mole ratio of p-bromo fluorobenzene to potassium being not less than about 1:1.

10. The method of preparing 3′-chloro-m-phenoxyphenol which comprises heating resorcinol and m-bromochlorobenzene and potassium carbonate in the presence of water and a cuprous oxide catalyst at a temperature within the range of 180°–195° C. in the liquid phase, the mole ratio of resorcinol to m-bromochlorobenzene being not less than about 3:1 and the mole ratio of m-bromochlorobenzene to potassium being not less than about 1:1.

References Cited

UNITED STATES PATENTS 3,247,245  4/1966  Teot et al. _____ 260—613 XR
3,294,846  12/1966  Livak et al. _____ 260—613

BERNARD HELFIN, Primary Examiner